Nov. 17, 1942.        E. B. FERNBERG        2,302,307
DEVICE FOR CLAMPING TOGETHER OVERLAPING MEMBERS
Filed Nov. 28, 1941        2 Sheets-Sheet 1
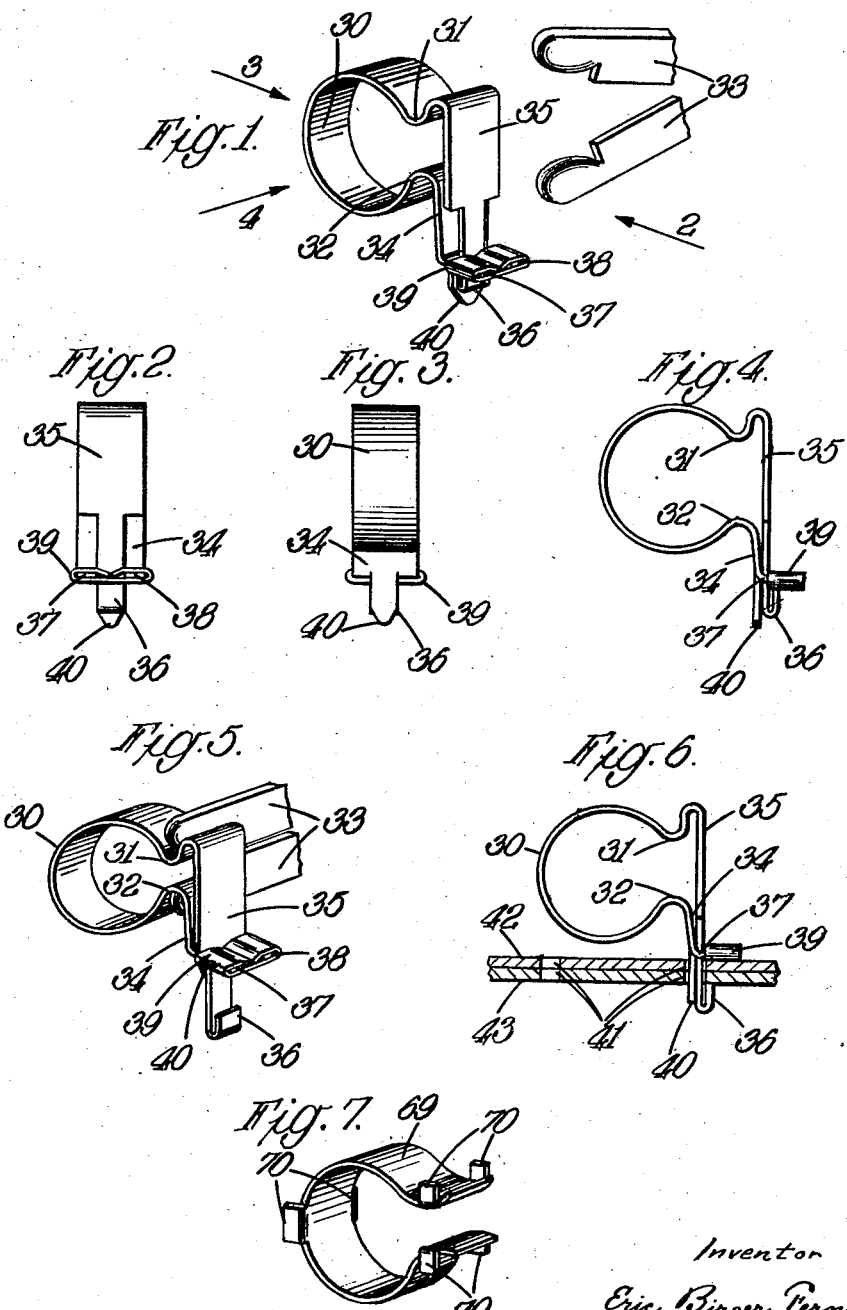

Nov. 17, 1942.  E. B. FERNBERG  2,302,307
DEVICE FOR CLAMPING TOGETHER OVERLAPING MEMBERS
Filed Nov. 28, 1941  2 Sheets—Sheet 2
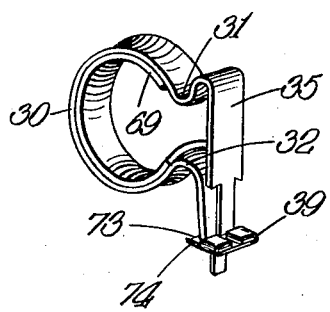
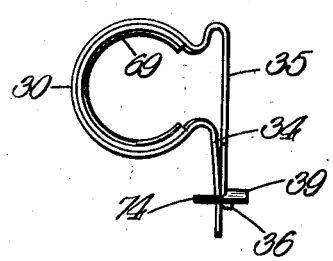
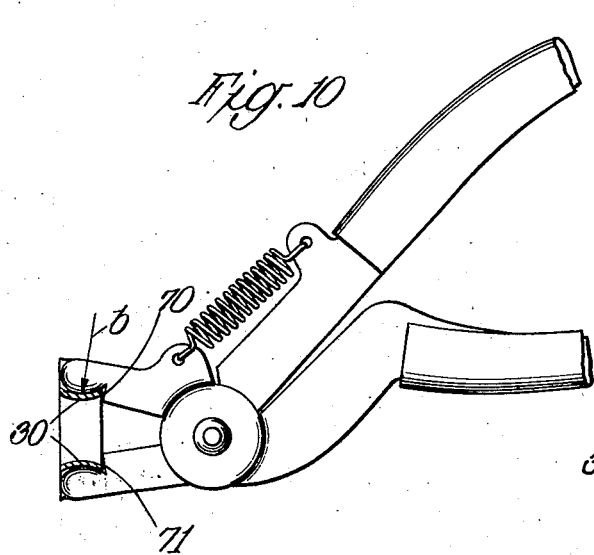
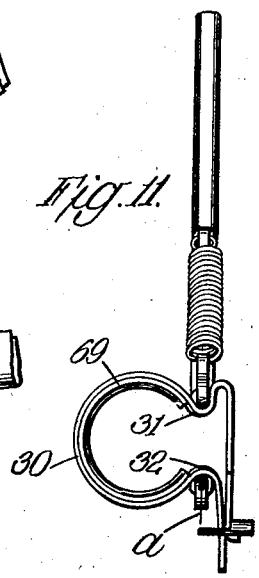
Inventor
Eric Birger Fernberg
by Malcolm W. Fraser
Attorney Patented Nov. 17, 1942

2,302,307

UNITED STATES PATENT OFFICE 2,302,307

DEVICE FOR CLAMPING TOGETHER OVERLAPPING MEMBERS

Eric Birger Fernberg, Pinner, England

Application November 28, 1941, Serial No. 420,790
In Great Britain February 5, 1940

6 Claims. (Cl. 85—5)

The present invention relates to an improved device for clamping together overlapping members such as pieces of sheet material, to facilitate, for example, such operations as the riveting of the members.

In riveting together two or more members such as the girders and/or sheets of a structure such as an aeroplane hull, it is necessary, before riveting is commenced, to hold the members together firmly, to align or bring into register corresponding rivet holes in the two or more members, and to peg about one hole in every ten, in order to prevent the members from buckling or creeping out of alignment as successive rivets are secured along a line of holes.

At the present time two methods are used for making such temporary assemblies. In the first, bolts or screws are used to clamp and align the sheets so that corresponding rivet holes in the respective sheets register one with the other. Clearly in such a method considerable time and labour is lost in inserting the many screws or bolts necessary to prevent creep.

In the second method a quick operating device comprising a claw is inserted through holes in the two or more plates, and the claw is then retracted by spring or screw means to clamp the several plates together between the hook of the claw and the base of a housing for the shank of the claw.

It is an object of the present invention to provide a fastener which functions to register the holes in the sheets accurately with respect to each other.

It is another object to provide a fastener with which sheets which have buckled or bent slightly can be drawn together and held firmly in contact whilst the subsequent riveting operation is performed.

Another object is to provide a fastener with which the plates to be riveted can be drawn together with a force greater than that which can be exerted by hand alone.

Yet another object is to provide a fastener which is cheap to manufacture and simple to operate.

With these ends in view, and in accordance with the invention there is provided a fastener for holding in position overlapping plates or other members in which registering holes have been provided, comprising a length of spring metal in the form of a loop having at its two free ends tongues bent so as to be roughly tangential to the loop and adjacent one another, the front tongue being provided with an offset shoulder of a size as will enable it just to pass through the said holes and being offset away from the rear tongue, which latter tongue is also provided with a shoulder, the arrangement being such that when the sides of the loop are pressed towards each other the said tongues are moved longitudinally and relatively to each other so as to cause the shoulders to move apart and thus to allow the offset shoulder on the front tongue to be inserted through the said holes and engaged behind the plates, and when pressure is released, the springiness of the loop causes the shoulders to approach each other to register accurately the holes in the plates and to grip the plates between them.

One or both of the shoulders may be formed by suitably bending parts of the spring metal itself and that shoulder nearest the loop may, if desired, be reinforced and enlarged by an additional piece of metal.

In order that the nature of the invention may be more clearly appreciated embodiments thereof will now be described with reference to the accompanying diagrammatic drawings in which Figure 1 is a perspective view of a fastener, Figures 2, 3 and 4 are views, in elevation, in the directions of the arrows 2, 3 and 4 respectively of Figure 1, Figure 5 is a perspective view of the fastener of Figure 1, but showing the spring portion pinched so that the legs can be passed through two roughly registering holes in the sheets to be secured, Figure 6 is an elevation showing the fastener of Figure 1 inserted in, and securing, two sheets, and Figure 7 illustrates a method of strengthening any of the spring loops shown in the other figures.

Figure 8 is a perspective view, and Figure 9 an elevation, of a modified form of fastener, and Figures 10 and 11 are side and end elevations respectively of a pliers used for compressing any of the fasteners shown.

Referring to Figures 1 to 6 inclusive, the device illustrated comprises a single strip of spring steel the centre portion of which is bent to form a loop 30 of C-shape; the ends of the C run into two opposite, inwardly turned bends 31 and 32 which are adapted to receive the arms 33 of a pair of pliers, and the free ends of the C are bent downwardly in roughly parallel directions to form a pair of legs 34 and 35. The front leg 35 is narrowed at its end as shown and the tongue so formed is folded outwardly and back upon itself to form an offset shoulder 36 (see Figures 4 and 5). The rear leg 34 at its end is sheared through with two parallel cuts and the outer pair of the three tongues so formed are bent outwardly and upwardly at right angles as at 37 and 38 so that one tongue lies on each side of the narrowed end of the leg 35. Around the arms 37 and 38 is pinched a piece of soft metal 39 which constitutes a shoulder or stop on the leg 34. The narrowed end or tongue of the leg 35 is free to slide longitudinally between the stop 39 and the middle tongue 40 of the leg 34, which latter tongue, as shown in Figure 3, is round or pointed so as to form a prong.

When the fastener is left free the offset shoulder 36 bears, as shown in Figure 4, against the underside of the shoulder 39, thus preventing the leg 35 from rising above the shoulder 39.

The device is used as follows: Referring to Figure 6, it will be assumed that it is desired to insert the fastener through a pair of holes 41 formed in two sheets 42 and 43 which are to be clamped together, and the holes in which are to be brought accurately into register prior to rivets being inserted in a series of such holes. First, the sheets 42 and 43 are placed together so that the rivet holes 41 are roughly in register; with a pair of pliers the loop 30 is then compressed as shown in Figure 5 so that the leg 34 is raised longitudinally and the leg 35 lowered also longitudinally until the rear tongue 40 rises well above the shoulder 36. The latter is then inserted through both holes 41. The loop 30 is then released so that the tongue 40 is free to pass through the two holes until the shoulder 39 bears on the top of the upper plate 42 and the shoulder 36 bears on the underside of the lower plate 43, the plates being thus clamped between the two shoulders. As shown in the figures, the angle between the legs 34 and 35 is exaggerated, and in practice as the tongue 40 descends into the holes in the plates the two legs 34 and 35 are bent so that they lie parallel and substantially in contact. The cross-section of the two legs combined, in the plane of the plates, is rectangular and such that contact is made with the faces of the holes at the four corners of the revtangle, and in this manner the two holes are brought accurately into register.

In the manufacture of the fastener the spring loop 30 is given a permanent set such that the legs 34 and 35 are separated by perhaps ¼ inch, with the end of the leg 35 well above the end of the tongue 40. During assembly the leg 35 is drawn into contact with the leg 34 and held there by the soft metal shoulder 39. It will be seen, therefore, that the fastener is in a state of tension due to compression even before it is brought into use. When, in use, the loop 30 is compressed in order to insert the fastener through holes in the plates, the tension is increased and a force, due to the sum of these tensions, tends, on the one hand, to separate the two legs 34 and 35 in a lateral direction so as to assist in registering accurately the holes in the plates, and, on the other hand, to draw the two shoulders towards each other in the longitudinal direction so as to clamp the two plates together. The offset shoulder 36 must be only slightly smaller than the holes in order that only a small displacement is needed to secure engagement.

In Figure 7 is illustrated a reinforcing spring which in operation is secured within any of the spring loops shown in the other figures. It is used to strengthen the loops and to increase their resistance to compression by the pliers in order to increase the force with which the plates to be riveted are held together, which is desirable when the resistance to pulling up is high. It may be formed from a rectangular strip 69 of spring steel and is formed with three pairs of lugs 70 which engage the edges of the loops 30 of the fasteners previously described.

The strength of the loop, or of the loop and the reinforcing spring where the latter is used, is such that the device cannot be operated by hand alone, it having been found in practice that the force necessary to bring together two or more plates satisfactorily under all conditions met with is greater than can be achieved by hand alone.

These fasteners are used frequently on assemblies comprising not only plates but also girders of angle section both of which members are frequently slightly bent or buckled, in which case it has been found (particularly for girders) that a fastener operated directly by hand, without the use of a tool, is of quite inadequate strength.

In the fastener of the present invention, therefore, the loop is operated with the aid of a pliers or other tool giving a mechanical advantage, and registering of the holes is achieved by virtue of the fact that the section of the two tongues is such that the four corners are in contact with the inside of the holes.

If an ordinary pliers be used to operate the fastener there is some danger of the fastener slipping out of the grip of the pliers or of the two tongues twisting relatively to one another. In order to eliminate this possibility the loop of the fastener may be ridged or beaded as shown in Figures 8 and 9, and in any case is preferably operated with the aid of a pliers which is constructed solely for such use and which is illustrated in Figures 10 and 11.

Another result of beading the loop of the fastener is that the lugs (70 of Figure 7) on the reinforcing member may be dispensed with provided that this member is beaded in a manner similar to the loop itself; such a beaded reinforcing member is shown at 69 in Figures 8 and 9.

Referring now to Figures 9 and 10, the nose of the pliers is radiused to fit substantially the radius of the bends 31 and 32 of the loop 30. The radius shown at $a$ of Figure 11 is, therefore, substantially equal to or less than the radius of the bends 31 and 32 of the loop 30. The nose, is however, also radiused, as shown at $b$ in Figure 10, in a plane perpendicular to that of Figure 11 and, as the pliers are squeezed shut, the nose of the pliers rolls in the beading of the loop and there is no tendency for the latter to twist. As shown in Figure 10, the spring loop 30 is stopped against abutments 70 and 71 by which means the two tongues of the fastener are aligned with respect to each other thus facilitating insertion of the two tongues into the holes of the plates to be fastened.

It will be noted that the fastener of Figure 8 differs from that shown in Figure 5 in the following respects: In the first place the end 36 of the outer tongue 35 is not turned up and folded upon itself but is merely turned up at right-angles. Secondly the shoulder 39 is extended rearwardly of the legs as at 73 in order to provide a larger bearing surface and to avoid the possibility of the fastener tending to tilt after it has been inserted in the plates. The edges of the shoulder 39 are flanger upwardly as shown at 74 in order to increase the strength and rigidity of the shoulder.

What is claimed is:

1. A fastener for holding in position overlapping members in which registering holes have been provided, comprising a transverse shoulder adapted to contact the outer overlapping member, a tongue projecting from said shoulder adapted to extend through the registering holes, a tongue having a clamping shoulder slidable along said first tongue, said clamping shoulder being adapted to extend through the registering holes and contact the inner overlapping member, spring means cooperating with said transverse shoulder for urging said second tongue to move said clamping shoulder toward said transverse shoulder, both of said tongues being a flat metal strip substantially rectangular in cross section thereby to enable said tongues to contact the holes of the members at four corners.

2. A fastener for holding in position overlapping members in which registering holes have been provided, comprising a flat strip of spring metal having at each end a projecting tongue and being bent into a loop with the tongues lying roughly parallel with a tangent to the loop and to each other, the front tongue being provided with an offset shoulder of a size as will permit it just to pass through the said holes and being offset away from the rear tongue, which tongue is also provided with a shoulder, said last shoulder comprising a lateral continuation of said metal strip and having a flat face directly contacting an overlapping member, and the arrangement being such that, when the sides of the said loop are pressed towards each other, the said tongues are moved longitudinally and relatively in directions causing the shoulders to move apart so that the offset shoulder on the front tongue can be inserted through the said holes and engaged behind the said members and, when pressure on the loop is released, the resilience of the loop causes the rear tongue to enter the holes and the shoulders to approach each other to register accurately the holes in the members and to grip the members between them, the loop being beaded in order to increase its strength as a spring.

3. A fastener for holding in position overlapping members in which registering holes have been provided, comprising a flat strip of spring metal having at each end a projecting tongue and being bent into a loop with the tongues lying roughly parallel with a tangent to the loop and to each other, the front tongue being provided with an offset shoulder of a size as will permit it just to pass through the said holes and being offset away from the rear tongue, which tongue is also provided with a shoulder, said last shoulder comprising a lateral continuation of said metal strip and having a flat face directly contacting an overlapping member, and the arrangement being such that, when the sides of the said loop are pressed towards each other, the said tongues are moved longitudinally and relatively in directions causing the shoulders to move apart so that the offset shoulder on the front tongue can be inserted through the said holes and engaged behind the said members and, when pressure on the loop is released, the resilience of the loop causes the rear tongue to enter the holes and the shoulders to approach each other to register accurately the holes in the members and to grip the members between them, and a reenforcing loop serving to increase the strength of the first mentioned loop as a spring.

4. A fastener for holding in position overlapping members in which registering holes have been provided, comprising a flat strip of spring metal having at each end a projecting tongue and being bent into a loop with the tongues lying roughly parallel with a tangent to the loop and to each other, the front tongue being provided with an offset shoulder of a size as will permit it just to pass through the said holes and being offset away from the rear tongue, which tongue is also provided with a shoulder, said last shoulder comprising a lateral continuation of said metal strip and having a flat face directly contacting an overlapping member, and the arrangement being such that when the sides of the said loop are pressed towards each other, the said tongues are moved longitudinally and relatively in directions causing the shoulders to move apart so that the offset shoulder on the front tongue can be inserted through the said holes and engaged behind the said members and, when pressure on the loop is released, the resilience of the loop causes the rear tongue to enter the holes and the shoulders to approach each other to register accurately the holes in the members and to grip the members between them, said loop being beaded and provided with a reenforcing member, in order to increase the strength of the loop as a spring.

5. A fastener for holding in position overlapping members in which registering holes have been provided, comprising a flat strip of spring metal having at each end a projecting tongue and being bent into a loop with the tongues lying roughly parallel with a tangent to the loop and to each other, the front tongue being provided with an offset shoulder of a size as will permit it just to pass through the said holes and being offset away from the rear tongue, which tongue is also provided with a shoulder, said last shoulder comprising a lateral continuation of said metal strip and having a flat face directly contacting an overlapping member, and the arrangement being such that when the sides of the said loop are pressed towards each other, the said tongues are moved longitudinally and relatively in directions causing the shoulders to move apart so that the offset shoulder on the front tongue can be inserted through the said holes and engaged behind the said members and, when pressure on the loop is released, the resilience of the loop causes the rear tongue to enter the holes and the shoulders to approach each other to register accurately the holes in the members and to grip the members between them, said loop being beaded and provided with a reenforcing member, in order to increase the strength of the loop as a spring, said reenforcing member also being beaded.

6. A fastener as claimed in claim 1, the dimensions of said tongues with respect to the dimensions of the registering holes being such that when the sides of the tongues adjacent to one another are substantially in face engagement, the four corners of the rectangle formed thereby engage the edge portions of the holes.

ERIC BIRGER FERNBERG.